United States Patent [19]

Reuter et al.

[11] Patent Number: 5,147,118
[45] Date of Patent: Sep. 15, 1992

[54] PRESSURE ACTUATOR FOR A FLUID ACTUATED BRAKING SYSTEM

[75] Inventors: David F. Reuter, Beavercreek; Thomas C. Downs, Tipp City; Alisa A. Greywitt, Centerville, all of Ohio

[73] Assignee: General Motors Corporation, Detroit, Mich.

[21] Appl. No.: 736,302

[22] Filed: Jul. 29, 1991

[51] Int. Cl.⁵ .............................................. B60T 8/42
[52] U.S. Cl. ............................ 303/115 EC; 188/162; 303/113 TR; 303/119 R
[58] Field of Search ...... 303/115 EC, 115 R, 113 TB, 303/113 TR, 110, 100, 93, 61, 119 R; 188/162

[56] References Cited

U.S. PATENT DOCUMENTS

| | | | |
|---|---|---|---|
| 3,231,315 | 1/1966 | Turnbull | 303/115 EC |
| 3,549,210 | 12/1970 | Birge et al. | 303/115 EC |
| 4,927,212 | 5/1990 | Harrison et al. | 303/115 |
| 5,011,237 | 4/1991 | Matouka et al. | 303/115 EC |
| 5,026,125 | 6/1991 | Matouka et al. | 303/115 EC |
| 5,026,126 | 6/1991 | Umasankar et al. | 303/115 EC |
| 5,042,885 | 8/1991 | Villec | 303/115 EC |

Primary Examiner—Douglas C. Butler
Attorney, Agent, or Firm—Ernest E. Helms

[57] ABSTRACT

A pressure actuator for a fluid activated braking system which can be utilized in anti-lock (ABS) or traction control (TC) systems is provided. In a preferred embodiment the pressure actuator has a piston threadably associated with the drive screw which has a flange. Encircling the drive screw and setting on a support are bevel washers. Upon downward movement of a piston, a nut associated with the piston is first cushioned by compressing the bevel washers wherein at a later point the bevel washers make contact with the flange of the drive screw and by providing frictional engagement therewith provide torsional restraint of the drive screw which also adds to the dampening of the downward movement of the nut and the associated piston. Therefore, the total amount of bevel washers needed for cushioning the downward movement of the nut is minimized and the overall length of the pressure actuator can be held at a minimum dimension.

4 Claims, 2 Drawing Sheets

PRESSURE ACTUATOR FOR A FLUID ACTUATED BRAKING SYSTEM

FIELD OF THE PRESENT INVENTION

The field of the present invention is that of pressure modulators for fluid actuated braking systems for automotive vehicles. Particularly, those in anti-lock braking systems (ABS) and/or traction control systems (TC).

DISCLOSURE STATEMENT

Pressure actuator, (commonly referred to as modulators) used in anti-lock braking systems typically modulate the pressure delivered to a vehicle wheel brake to prevent the vehicle wheel from locking up in the braking condition. Two anti-lock braking systems are shown in commonly assigned U.S. Pat. Nos. 5,011,237 and 5,000,523. In both of the aforementioned braking systems, an electronic controller signals a motor which is gearably engaged with a driven member which is in turn threadably engaged with an actuator piston (or associated nonrotative nut). Piston movement is then used to modulate the pressure delivered to the vehicle wheel brake.

One of the most critical factors in the operation of the ABS system is the speed of the dump cycle which is the initial cycle of operation wherein it is desirable to reduce the pressure within the wheel brake as rapidly as possible since the controller has sensed a locking condition. This will cause the driven member (commonly referred to as the drive or ball screw to be rotated at its maximum rotational speed possible by the motor. Retractive movement by the piston will also be aided by the pressure within the wheel brake which also is pushing against the piston. It has been found to be desirable to provide some type of cushioning to prevent the rapid retractive movement of the piston from causing any damage to the pressure actuator.

Typically, the shock absorption is accomplished by the use of bevel washers which can surround the drive screw. The use of bevel washers adds to the length of the pressure actuator. However, another critical design criteria of a pressure actuator is that its total length be minimized due to the space envelope of the braking system under the hood of the vehicle. Therefore, it is desirable to make the pressure actuator as short as possible and any method utilized the cushion the retractive movement of the piston and its associated nut should be designed in such a way to keep its effect on the pressure actuators length at a minimum.

SUMMARY OF THE INVENTION

The present invention provides a pressure actuator for a fluid activated braking system which can be utilized on the aforementioned ABS or TC systems. To reduce the space envelope of the aforementioned braking systems, the present invention in a preferred embodiment provides a pressure actuator which has a drive screw with a flange member. Encircling the drive screw and setting on a support means which is generally locationally fixed with respect to the actuator frame are bevel washers. Upon downward movement of the nut, the nut is first cushioned by compressing the bevel washers wherein at a later point the bevel washers make contact with the flange of the drive screw and by providing frictional engagement therewith provide torsional restraint of the drive screw which also adds to the dampening of the downward movement of the nut. Therefore, the total amount of bevel washers needed for cushioning the downward movement of the nut is minimized and the overall length of the pressure actuator can be held at a minimum dimension.

It is an object of the present invention to provide a pressure actuator for a braking system.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
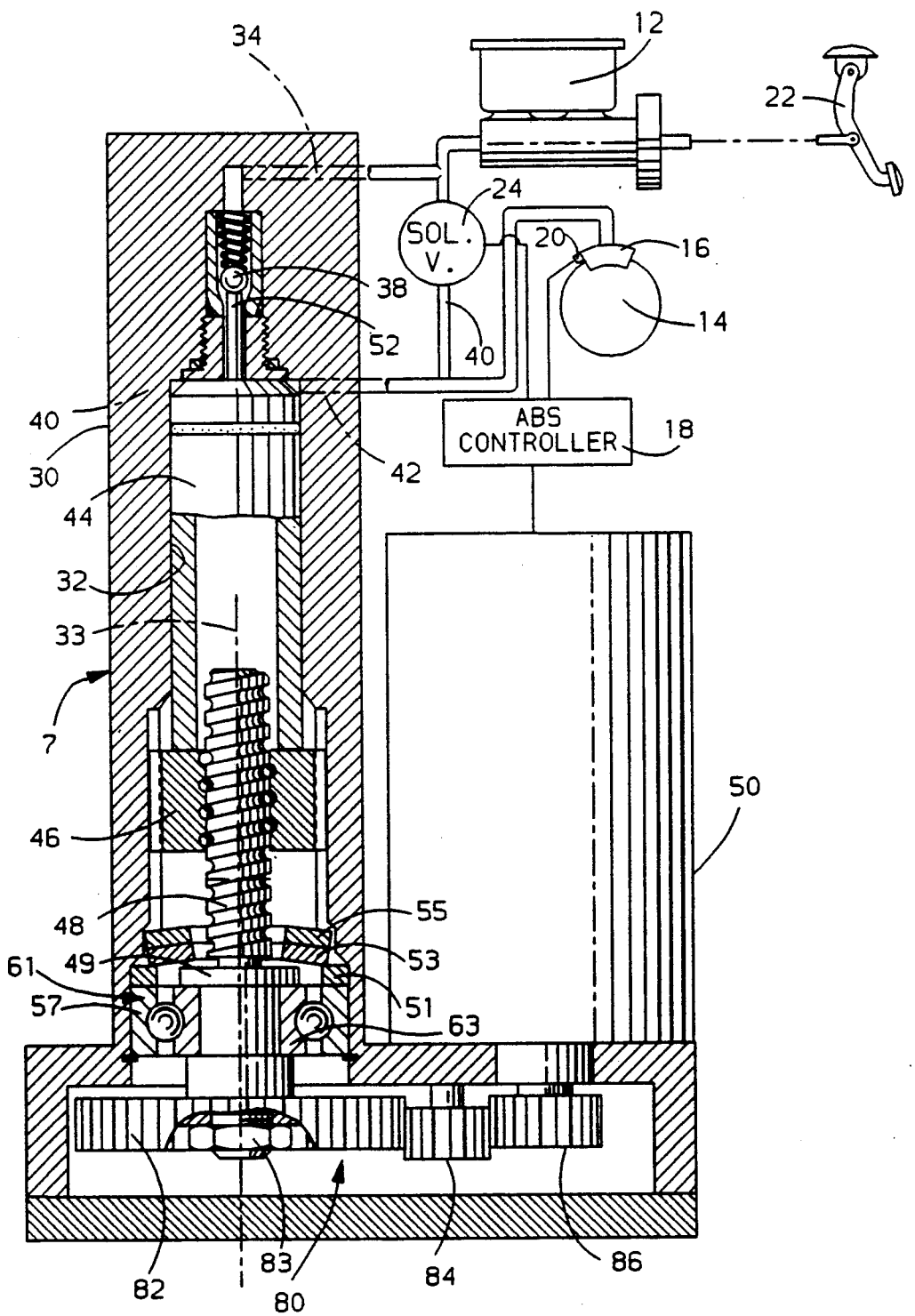
FIG. 1 is a schematic view shown partially in section of a preferred embodiment of the present invention for one vehicle wheel brake.

The vehicle wheel braking system pressure actuator 7 of the present invention is shown in the application of an anti-lock braking system (ABS) which includes a master cylinder 12 for supplying pressurized fluid. Connected on the wheel 14 and schematically shown, is a fluid activated wheel brake cylinder 16 (hereinafter referred to as a wheel brake) which receives pressurized fluid from the master cylinder for restraining rotational movement of the wheel 14. The wheel brake 16 utilized may be a conventional drum or disc type vehicle brake.

An ABS electronic controller 18 is also provided. A sensor 20 in the vehicle wheel brake 16, determines the wheel 14 rotational speed and another sensor (not shown) determines whether or not the brake pedal 22 of the vehicle is activated. Both sensors feed information to the ABS controller 18. The ABS controller 18 will be cognizant of the rotational condition of the wheel and will provide an appropriate signal in response thereto. The signal will place the brake system in an ABS mode of operation if the condition of the wheel 14 is within preset parameters.

A normally open solenoid valve 24, when activated to a closed position in response to a signal given by the controller 18, functions as an isolation valve to prevent fluid communication between the master cylinder 12 and the wheel brake 16.

The pressure actuator 7 has a frame 30 with a multi-diametered longitudinal bore 32. A pressure actuator can be provided for each wheel brake of the vehicle, or if desired, a plurality of wheel brakes can be connected to a single pressure actuator. The longitudinal bore 32 has a first fluid connection 42 allowing fluid communication with the wheel brake 16 and the longitudinal bore 32 also has fluid communication with the master cylinder 12 when the solenoid valve 24 is not activated to the closed position via a line 40. Additionally, as shown, the longitudinal bore 32 has a second or alternative fluid communication path with the master cylinder 12.

As shown, a portion of the bore 32 is upstream of the solenoid valve 24 and passages 42. Fluid flow passes through a transverse intersecting path 34 of the frame 30. However, the solenoid valve 24 (in an embodiment not shown) could directly tie into the path 34 and the passage 42 could be extended through the bore 32 out to the other side of the frame 30 and then be connected with the relocated solenoid 24.

Mounted within the multi-diametered bore 32 is a check valve 38 which allows delivery of fluid back to the master cylinder 12 whenever the wheel brake 16 has a pressure greater than that in the master cylinder 12. Therefore, the braking system is sensitive to an operator relieving the brake by partially removing his or her foot from the pedal 22 without any needed input from the controller 18.

The piston 44 is slidably and sealably mounted within the longitudinal bore 32. Movement of the piston 44 provides a variable control volume in communication with the wheel brake 16, thereby modulating the pressure therein. A nut 46 operatively associated with piston 44, in the example shown is connected with the piston 44 and the nut 46 is slidably mounted within the longitudinal bore 32 in a non-rotative fashion.

A power screw 48 projects into the nut and is threadably engaged therewith in an efficient manner. The power screw 48 has a fixed rotational axis 33 with respect to the actuator frame 30. Powering the power screw is a reversible DC motor 50 which is responsive to the signals given to it by the controller 18. In the position shown, for normal braking operation, the piston 44 is held at the extreme up position and must be held within a tolerance of 3/100 of an inch to maintain the check valve 38 in the open position via the rod 52 (tolerance shown in FIG. 1 greatly enlarged for purposes of illustration).

The power screw 48 is torsionally associated with a gear train 80 which is in turn torsionally associated with the motor 50. The power screw is mounted by bearings and has at an end a large gear 82 connected thereto. The large gear 82 meshes with an optional idler gear 84 which in turn meshes with a smaller pinion gear 86. The pinion gear 86 axially floats on a rotor shaft 88 of the motor and is held on by a spring clip (not shown).

In operation when an impending wheel lock condition is sensed by the sensor 20 the sensor will signal the controller 18 to then in turn signal the solenoid valve 24 to a closed position. The above will isolate the wheel brake 16 from the master cylinder 12. Simultaneously, the controller 18 will signal the motor 50 to power the drive screw in a direction to make the nonrotative nut 46 retract along with its associated piston 44. Such movement will cause the check valve 38 to be closed isolating the brake 16 from fluid communication with the brake cylinder 12 via the alternative flow path.

To maximum the performance of the ABS system the initial pressure release cycle should be accomplished as fast as possible. Therefore, the motor 50 will be signaled to its maximum power in the retractive direction. Aiding in the retractive movement of the piston 44 will also be the pressure which is already within the wheel brake 16.

Figure 2:
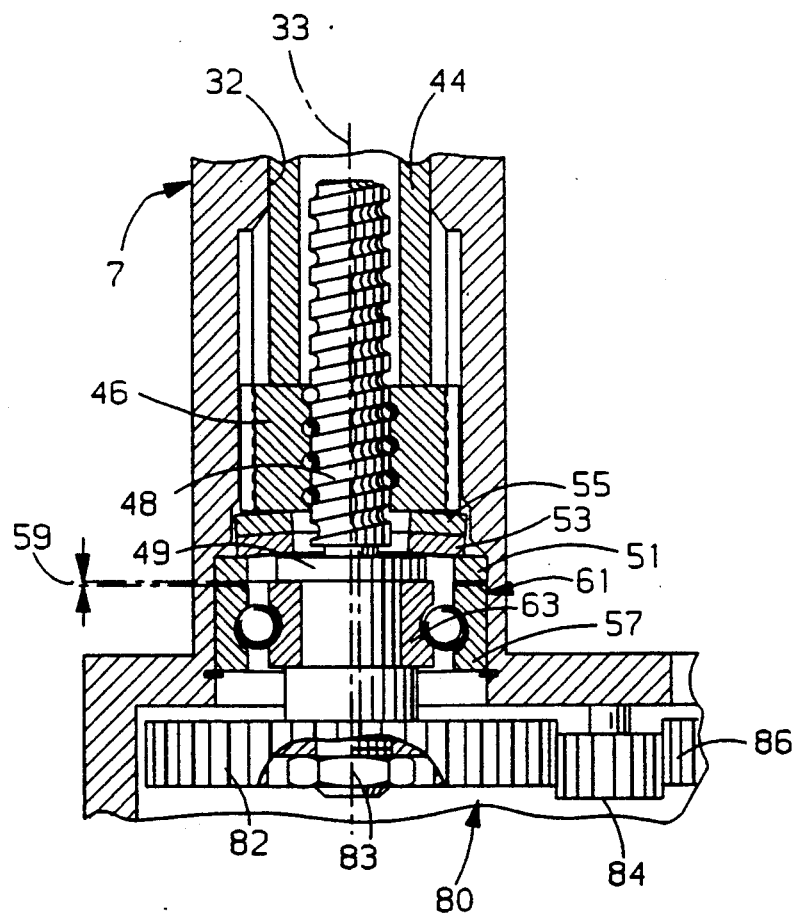
FIG. 2 is an operational view of a portion of the invention pressure modulator illustrated in FIG. 1.

Referring additionally to FIG. 2, the torsional inertia of the motor 50 along with the torsional inertia provided by the gear train 80 and the drive screw 46 make it rather difficult for the pressure actuator to cease the retractive movement of the nut 46 in the first cycle before the nut 46 achieves an extreme retractive position within the bore 32. To cushion the nut 46 as it travels downward and to prevent damage to the pressure actuator 7 there are provided two bevel washers 53 and 55 which arch upward towards the nut 46 in a series arrangement. The bevel washers are supported on a support means 51 which is usually inserted with the actuator frame 30 (in a loose fit) and is generally locationally fixed with respect thereto making contact with an outer race 57 of a thrust bearing 61 which supports the drive screw 48.

The drive screw 48 has a flange 49 which is supported on an inner race 63 of the bearing. The axial length of the flange is less than that of the support means 51. Referring additionally to FIG. 2, upon downward movement of the nut 46 the nut 46 will initially contact the top of the bevel washer 55. The contact of the nut 46 with the bevel washer will cause a tension load to be applied to the ball screw 48 causing the ball screw to be pulled upward to take up the clearance within the thrust bearing (the bottom of the drive screw 46 is attached with the gear 82 via a nut 83 which is threadably attached to the opposite end of the drive screw 48).

The above-mentioned displacement (along with a slight elongation of the drive screw 48) causes the top of the flange 49 to be dislocated upwardly a distance 59 to make contact with the adjacent side of the bevel washer 53 (at a position axially more adjacent to the nut 46 than the support 51).

The upward movement of the flange 49 accomplishes two separate things. The first thing that it accomplishes is that it limits the downward deflection of the bevel washers 55,53 to not more than 75 percent of the maximum deflection downward therefore preserving their spring characteristics. Additionally, the bevel washers will cause frictional engagement with the flange 49 imparting a restrictive torsional force equal to the radius of the contact between the bevel washers and the flange times the normal force component of the force between the bevel washers 55,53 and the flange 49 times its coefficient of friction. The torsional friction imposed upon the drive screw helps to absorb energy and dampen the drive screw rotational movement therefore lessening the impact of the nut 46 with the bottom of the actuator frame 30. Because of the torsional restraint the total amount of bevel washers needed to provide sufficient dampening to prevent damage from shock is lessened and therefore the total pressure actuator 7 length which is a direct function of the amount of bevel washers required can be minimized.

While one embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle wheel braking system pressure actuator for modulating a fluid pressure within a vehicle wheel brake, the actuator comprising:
    an actuator frame having a bore with means of fluid communication with the wheel brake;
    a piston slidably sealably mounted in the bore for providing a variable control volume in communication with the wheel brake and thereby modulating the pressure therein;
    a nut operatively associated with the piston and slidably mounted within the bore in a non-rotative fashion;
    a power screw projecting into the nut and threadably engaged therein, the power screw having a fixed rotational axis with respect to the actuator frame and a thrust flange generally adjacent an end of the power screw;

support means locationally generally fixed with respect to the actuator frame;

at least one bevel washer, supported on the support means encircling the power screw and arching toward the nut wherein movement of the nut towards the thrust flange causes the nut to flatten the washer and further movement of the nut causes the washer to contact and provide braking friction to the flange.

2. A modulator as described in claim 1 wherein there is at least two bevel washers encircling the power screw in series.

3. A modulator as described in claim 1 wherein the support means has a location generally axially more adjacent to the nut than the flange until the nut makes contact with the bevel washer causing the power screw to be translated axially towards the nut and wherein the flange travels axially past the location of the support means and contacts the washer preventing the washer from being totally flattened out.

4. A method of modulating a fluid pressure within a vehicle fluid actuated wheel brake comprising:

providing an actuator frame having a bore with means of fluid communication with the wheel brake;

slidably sealably mounting within the bore a piston to provide for a variable control volume in communication with the wheel brake;

operatively associating with the piston a nut slidably mounted within the bore in a nonrotative fashion;

threadably projecting into the nut a power screw threadably engaged with the nut having a thrust flange and a fixed rotational axis with respect to the actuator frame;

supporting a bevel washer encircling the power screw and arching towards the nut on a surface generally locationally fixed with respect to the actuator frame;

moving the nut towards the thrust flange causing the nut to flatten the washer and to contact the thrust flange; and frictionally engaging the thrust flange with the washer to restrain rotation of the flange and power screw.

* * * * *